United States Patent
Tarnowski

(10) Patent No.: US 11,415,103 B2
(45) Date of Patent: Aug. 16, 2022

(54) POWER SYSTEM AND METHOD FOR OPERATING A WIND POWER SYSTEM WITH A DISPATCHING ALGORITHM

(71) Applicant: VESTAS WIND SYSTEMS A/S, Aarhus N (DK)

(72) Inventor: Germán Claudio Tarnowski, Virum (DK)

(73) Assignee: VESTAS WIND SYSTEMS A/S, Aarhus N (DK)

(*) Notice: Subject to any disclaimer, the term of this patent is extended or adjusted under 35 U.S.C. 154(b) by 0 days.

(21) Appl. No.: 16/443,195

(22) Filed: Jun. 17, 2019

(65) Prior Publication Data
US 2019/0360461 A1    Nov. 28, 2019

Related U.S. Application Data

(63) Continuation of application No. 14/399,808, filed as application No. PCT/DK2013/050138 on May 10, 2013, now Pat. No. 10,400,752.
(Continued)

(30) Foreign Application Priority Data

May 11, 2012  (DK) .......................... PA 2012 70246

(51) Int. Cl.
*F03D 7/02*   (2006.01)
*F03D 9/25*   (2016.01)
*F03D 7/04*   (2006.01)

(52) U.S. Cl.
CPC ........... *F03D 7/0284* (2013.01); *F03D 7/028* (2013.01); *F03D 7/04* (2013.01); *F03D 7/048* (2013.01); *F03D 9/257* (2017.02); *Y02E 10/72* (2013.01)

(58) Field of Classification Search
None
See application file for complete search history.

(56) References Cited

U.S. PATENT DOCUMENTS

| 8,046,110 B2 | 10/2011 | Mayor et al. |
| 8,295,989 B2 * | 10/2012 | Rettger .................. H02J 3/381 700/291 |

(Continued)

FOREIGN PATENT DOCUMENTS

| EP | 1914420 A1 | 4/2008 |
| EP | 2020506 A2 | 2/2009 |

(Continued)

OTHER PUBLICATIONS

International Search Report for PCT/DK2013/050138, dated Aug. 20, 2013.
Danish Search Report for PA 2012 70246, dated Dec. 20, 2012.

*Primary Examiner* — Charles E Anya
(74) *Attorney, Agent, or Firm* — Patterson + Sheridan, LLP

(57) ABSTRACT

The present invention relates to a power system having a plurality wind turbine generators and a power plant controller arranged to communicate with the plurality of wind turbines generators, where each of the plurality of wind turbine generator being related to a wind turbine controller, the wind turbine controller being arranged to control an active power output in its related wind turbine generator according to an active power set point received from the wind power plant controller; a first subset of wind turbine generators operating at an active power output unrestricted of the active power set point; and a second subset of wind turbine generators operating according to an active power set point; and wherein the wind power plant controller communicates the active power set point, in accordance with the active power output of the first subset of the plurality of (Continued)

wind turbines generators, so as to reduce active power fluctuation of the aggregated active power output of the first and second subset of the plurality of wind turbines generators. The present invention also relates to method accordingly.

20 Claims, 9 Drawing Sheets

Related U.S. Application Data

(60) Provisional application No. 61/663,991, filed on Jun. 25, 2012.

(56) References Cited

U.S. PATENT DOCUMENTS

| | | | |
|---|---|---|---|
| 2008/0088129 A1 | 4/2008 | Altemark et al. | |
| 2008/0116690 A1* | 5/2008 | Kabatzke | F03D 7/0276 |
| | | | 290/44 |
| 2010/0067526 A1* | 3/2010 | Lovmand | G05B 15/02 |
| | | | 370/389 |
| 2010/0145533 A1* | 6/2010 | Cardinal | H02J 3/383 |
| | | | 700/291 |
| 2010/0215493 A1* | 8/2010 | Abdallah | F03D 7/0256 |
| | | | 416/23 |
| 2010/0286835 A1* | 11/2010 | Nyborg | F03D 7/0224 |
| | | | 700/287 |
| 2011/0118884 A1* | 5/2011 | Mayor | H02J 3/46 |
| | | | 700/287 |
| 2011/0140428 A1 | 6/2011 | Wakata et al. | |
| 2011/0142619 A1 | 6/2011 | Subramanian et al. | |
| 2012/0104755 A1* | 5/2012 | Hashimoto | F03D 7/0284 |
| | | | 290/44 |
| 2012/0136494 A1* | 5/2012 | Kirchner | H02J 3/381 |
| | | | 700/287 |
| 2012/0248772 A1* | 10/2012 | Shigemizu | H02J 3/386 |
| | | | 290/44 |
| 2012/0271470 A1* | 10/2012 | Flynn | H02J 3/381 |
| | | | 700/292 |
| 2015/0159626 A1 | 6/2015 | Tarnowski | |

FOREIGN PATENT DOCUMENTS

| | | |
|---|---|---|
| JP | 200123845 A | 1/2001 |
| WO | 2008055503 A2 | 5/2008 |
| WO | 2012/019613 A1 | 2/2012 |
| WO | 2012/028150 A2 | 3/2012 |

* cited by examiner

POWER SYSTEM AND METHOD FOR OPERATING A WIND POWER SYSTEM WITH A DISPATCHING ALGORITHM

CROSS-REFERENCE TO RELATED APPLICATIONS

This application is a continuation of co-pending U.S. patent application Ser. No. 14/399,808 filed on Nov. 7, 2014 (which issued on Sep. 3, 2019 as U.S. Pat. No. 10,400,752), which is a national stage entry of PCT/DK2013/050138 filed on May 10, 2013, which claims priority to Danish Patent Application PA 2012 70246 filed on May 11, 2012 and to U.S. provisional patent application 61/663,991 filed on Jun. 25, 2012. Each of these applications is hereby incorporated by reference in its entirety.

FIELD

The present invention relates to a power system with reduced power fluctuations, and to a method to reduce power fluctuations in a wind power plant.

BACKGROUND

In an electrical utility grid consumers can usually consume electric power in an uncontrolled manner. Since hardly any energy is stored in the grid, no imbalance can exist between the power produced and the power consumed. Therefore, the momentary production of power shall match the momentary power consumption. Overproduction leads to an increase of the grid frequency beyond the nominal value (e.g., 50 or 60 Hz), since the conventional synchronous generators accelerate, while over consumption will lead to a decrease of the grid frequency beyond the nominal value (e.g., 50 or 60 Hz), since the conventional synchronous generators will then decelerate.

In order to stabilize the frequency of the electrical grid, conventionally about 10% of the producers contribute to what is called "primary power control". These producers, also referred to as "primary controllers", increase power output when the frequency falls below the nominal value and decrease power output when it rises above the nominal value.

Conventionally, wind turbine generators do not contribute to primary control, firstly because wind turbine generators cannot normally increase their output power by command (as they normally operate at nominal load or, when operating at partial load, at an optimal working point), and secondly because the available wind power shall normally be entirely exploited.

Generally, wind power adds an additional moment of grid instability because, with a significant fraction of wind power in a grid, not only the consumption is uncontrolled, but also the production by wind turbine generators. Even though wind forecasts enable the wind power production to be predicted with considerable accuracy on a long-term basis (at the level of hours), the wind speed normally fluctuates in an unpredictable manner on a short-term basis (at the level of minutes down to a few seconds). A wind turbine generator operating at partial load (i.e. when the wind speed is below the nominal wind speed of the wind turbine generator considered) will normally transform these wind-speed fluctuations into corresponding fluctuations of the amount of real power produced and supplied to the electrical grid. Only at wind speeds above nominal, when a wind turbine generator operates at nominal load, wind turbine generators normally control their output power to be constant at the nominal output power.

The consequence of fluctuating-power production by wind turbine generators on the grid stability depends on characteristics of the grid. In a large, stable grid a power fluctuation by a wind turbine generator or wind power plant will not produce any significant response in the form of a frequency fluctuation. Thus, such grids can cope with higher power variations.

SUMMARY

This Summary is provided to introduce a selection of concepts in a simplified form that are further described below in the Detailed Description. This summary is not intended to identify key features or essential features of the claimed subject matter, nor is it intended to be used as an aid in determining the scope of the claimed subject matter.

In an aspect, the present invention relates to a power system having a plurality wind turbine generators and a power plant controller arranged to communicate with the plurality of wind turbines generators, comprising:

each of the plurality of wind turbine generator being related to a wind turbine controller, the wind turbine controller being arranged to control an active power output in its related wind turbine generator according to an active power set point received from the wind power plant controller;

a first subset of wind turbine generators operating at an active power output unrestricted of the active power set point;

a second subset of wind turbine generators operating according to an active power set point;

and wherein the wind power plant controller communicates the active power set point, in accordance with the active power output of the first subset of the plurality of wind turbines generators, so as to reduce active power fluctuation of the aggregated active power output of the first and second subset of the plurality of wind turbines generators.

An advantage of first aspect is mainly that a wind power plant can produce power with reduced power fluctuation, as the dispatcher help identifying which wind turbine generator can regulate the fluctuation and which will fluctuate.

According to one embodiment of the invention the power plant controller is arranged to define the first and second subsets of wind turbine generators from the plurality of wind turbine generators, in accordance with a selection algorithm.

An advantage of this embodiment is that the present invention will make the selection of which turbines belong to the first subset and which belong to the second subset.

According to one embodiment of the invention the selection algorithm selects the first and second subset of wind turbine generators in accordance with an actual wind speed at each of the plurality of wind turbine generators.

An advantage of this embodiment of present invention is that by using wind speed there is a direct correlation to the produced power, and thus which turbine will produce power below rated power i.e. with fluctuating power. Similar selection algorithm can be made based on produced power.

According to one embodiment of the invention the plurality of wind turbine generators receives a common active power set point reference.

An advantage of this embodiment of present invention is that inside the wind power plant, the power generated from each fluctuating wind turbine generator is always lower than the power generated from each regulated wind turbine generator. Therefore all wind turbine generators in the wind power plant can receive the same common set point value from a central controller, thus wind turbine generator with low wind speed will generate just what is possible locally while wind turbine generator with surplus of wind will follow the common set point value.

According to one embodiment of the invention the common active power set point reference is defined as:

$$P_{setpoint} = \frac{P_{Demand} - P_{Fluctuating}}{\text{Number of regulated wind turbine generators}}$$

An advantage of this embodiment of the present invention is that a simple equation defines the active power set point.

According to one embodiment of the invention the common active power set point reference is overruled by another active power set point.

An advantage of this embodiment of present invention is that a common set point value may be restricted locally at each wind turbine generator depending on local constraints, e.g., maximum/minimum powers, individual de-loading, etc. In such case, the dispatcher will take the individual wind turbine generators as non-controllable (i.e. fluctuating).

According to one embodiment of the invention the first subset of wind turbine generators and the second subset of wind turbine generators are located within the same or adjacent wind power plant(s).

An advantage of this embodiment of present invention is that wind power plant located at sites where the wind speed varies from turbine to turbine, can be optimized.

According to one embodiment of the invention the first subset of wind turbine generators and the second subset of wind turbine generators are located at two or more geographical locations.

An advantage of this embodiment of present invention is that several wind power plants can be considered in an overall strategy of injecting non-fluctuating power into the electrical grid. This means that active power from one wind power plant can fluctuate, but where other plant(s) can compensate for the fluctuations. There might be locale restrictions on the transmissions lines that limit the geographical area, to which this invention may be applied.

In a second aspect, the present invention relates to a method for operating a wind power system, comprising a subset of wind turbine generators and a second subset of wind turbine generators, the method comprises the steps of:

analyzing an active power output of each of the first subset of wind turbine generators;

calculating an active power set point to at least the second subset of wind turbine generators based on the active power output of the first subset of wind turbine generators;

dispatching the active power set point to at least each of the second subset of wind turbine generator to minimize power fluctuations.

The advantages of the second aspect and its embodiments are equivalent to the advantages for the first aspect of the present invention.

The individual aspects of the present invention may each be combined with any of the other aspects. These and other aspects of the invention will be apparent from the following description with reference to the described embodiments.

Any of the attendant features will be more readily appreciated as the same become better understood by reference to the following detailed description considered in connection with the accompanying drawings. The preferred features may be combined as appropriate, as would be apparent to a skilled person, and may be combined with any of the aspects of the invention.

BRIEF DESCRIPTION OF THE FIGURES

The power system and its method according to the invention will now be described in more detail with regard to the accompanying figures. The figures show one way of implementing the present invention and is not to be construed as being limiting to other possible embodiments falling within the scope of the attached claim set.

DETAILED DESCRIPTION

Figure 1:
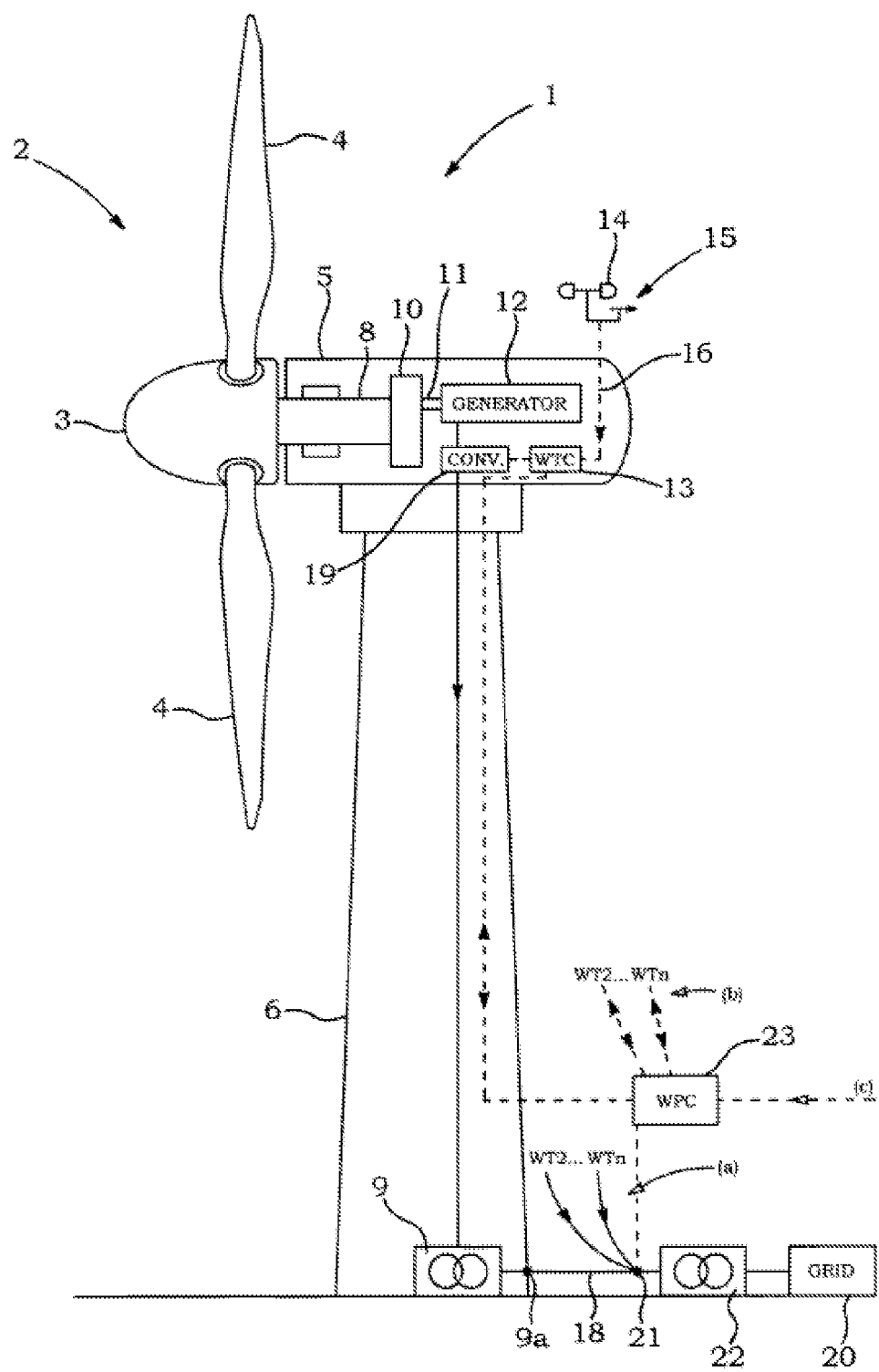
FIG. 1 shows a wind turbine generator according to the present invention.

The present invention will now be explained in further details. While the invention is susceptible to various modifications and alternative forms, specific embodiments have been disclosed by way of examples. It should be understood, however, that the invention is not intended to be limited to the particular forms disclosed. Rather, the invention is to cover all modifications, equivalents, and alternatives falling within the spirit and scope of the invention as defined by the appended claims.

The individual elements of an embodiment of the invention may be physically, functionally, and logically implemented in any suitable way such as in a single unit, in a plurality of units or as part of separate functional units. The invention may be implemented in a single unit, or be both physically and functionally distributed between different units and processors.

The embodiments of the present invention pertain to a power system with a plurality of wind turbine generators (e.g., a variable-speed wind turbine generator). The power system seeks to produce an aggregated power from all the wind turbine generators, with as little, as possible power fluctuations.

The reduced fluctuations are reached by making two subsets of wind turbine generator. The first subset of wind turbine generators comprises turbines that will operate at a power production that is not limited or reduced by an external power set point, i.e. unrestricted of the power set point, and thus may produce power with fluctuations as the wind speed may fluctuate. The second subset of wind turbine generators, comprises turbines that are constrained or restricted in their power production by an external power set point, i.e. the power production is therefore curtailed.

Both subsets may receive a power set point from a dispatcher, which decides the wind turbine generators that should be regulated and ones that should be unregulated. The unregulated or unconstrained turbines are of course still regulated within the limits of the wind turbine generator itself, meaning that production above rated power is restricted, and temperature limit and etc. see more below.

In an embodiment only the second subset receives a power set point.

The dispatcher is concerned about having a constant power output given by an external general power set point. In the present invention the main concerned is about having a nearly constant power output from a plurality of wind power sources, meaning that there will be a curtailment of the production in one virtual subset. This is achieved by measuring or monitoring the power production from both subsets, but mainly from the first subset and then dispatching a power set point to the second subset that counteracts the power fluctuations of the first subset.

The objective of the dispatcher is to use the surplus of available power from a subset of wind turbine generators inside a wind power plant to compensate the lack of power in others wind turbine generators, thus regulating the total wind power plant power output to a desired value.

In other words, the first subset of wind turbine generators will be controlled in order to compensate the fluctuations in the second subset of wind turbine generators, with the overall objective of having a constant or desired value of total power output from the wind power plant.

The consequence of the dispatcher action is that we will have a curtailment in the second subset. In some embodiments may the curtailed power may not be of utility for the grid operator. In other embodiments the curtailed power may be used as a reserve.

In critical grid situation the dispatcher action may be disabled by a mode switch and the curtailed power can be injected into the grid, knowing that this may introduce power fluctuations.

The wind turbine generator (e.g., a variable-speed wind turbine generator) which supplies power to an electric grid which may be equipped with other regulation capacity against grid-frequency and active power fluctuations. "Electric grid" or "grid" is a utility grid outside the boundary and point of common coupling of a wind power plant; when reference is made to the grid within a wind power plant an expression with explicit indication to the wind power plant is made, e.g., "wind-park grid". Regulation capacity against grid-frequency fluctuations is, e.g., provided by a certain fraction (typically about 10%) of primary controllers, which are typically conventional producers, which may use steam- or gas-driven turbines and fossil energy sources, or hydropower). The primary controllers increase power output when the frequency falls below the nominal value (e.g., 50 or 60 Hz) and decrease power output when it rises above the nominal value.

As the present text deals with active power rather than reactive power, active power is briefly referred to as "power", or "output power". Where reactive power is addressed, it is explicitly referred to as "reactive power".

There is an upper limit to the output power which can be produced by the wind turbine generator according to the embodiments, e.g., due to structural limits and a current limit in the wind turbine generator's electric converter. This amount of power is referred to as "nominal power". The wind speed sufficient for the wind turbine generator to produce the nominal power is referred to as "nominal wind speed". When the wind turbine generator according to the embodiments operates at wind speeds above the nominal wind speed, only that fraction of the available wind power is transformed to electric output power which corresponds to the nominal power. This reduction of power production is, e.g., achieved by gradually changing the rotor-pitch angle towards the so-called flag position. In other words, the wind turbine generator intentionally is not operated at optimum efficiency. In some embodiments the wind turbine generator is also operated at a sub-optimal tip-speed ratio so as to reduce structural loads.

By contrast, during operation at partial load, i.e. at wind speed below the nominal wind speed, the wind turbine generator according to the embodiments is operated at optimum efficiency. For example, it is operated with the aerodynamically optimal blade pitch angle and tip-speed ratio. Generally, the wind speed fluctuates in an unpredictable manner on a short-term basis (at the level of minutes down to a few seconds). When operating at partial load and with optimum efficiency the wind turbine generator according to the embodiments transforms these wind-speed fluctuations in a nearly one-to-one manner into corresponding wind-caused fluctuations of the amount of real power produced and supplied to the electrical grid. Fluctuations in the wind direction may also contribute to the wind-caused fluctuations of the amount of real power produced result in and supplied to the electrical grid because a wind-turbine's yaw adjustment mechanism is generally not able to immediately align the wind turbine generator's rotor axis to the wind direction. A misaligned rotor has a reduced efficiency so that fluctuations in the wind direction are a further source of wind caused fluctuations of the amount of real power produced and supplied to the electrical grid.

As mentioned at the outset, the consequence of fluctuating-power production by wind turbine generators on the grid stability depends on characteristics of the grid. In a large, stable grid a power fluctuation by a wind turbine generator or wind power plant will not produce any significant response in the form of a frequency fluctuation. However, in a small isolated grid, or in weak grids, such a power fluctuation may produce a significant frequency fluctuation. A certain ability of the grid to compensate imbalances of power production and compensation and regulate resulting frequency variations, i.e. a certain degree of stiffness or weakness of the grid, is referred to as "grid-stability".

The inventor has recognized that the grid-stability may vary over time, for example due to grid related failures, such as islanding of that part of the grid in which the wind turbine generator is located, due to primary-producer failures, etc. The inventor has also recognized that a deterioration of the grid stability can be detected by monitoring e.g., frequency fluctuations on the grid. Moreover the inventor has recognized that it is desirable in the case of a deterioration of the grid stability conditions to limit the output-power fluctuations produced by the wind turbine generator and supplied to the grid or if the wind turbine generator has already operated with limited output-power fluctuations before the deterioration occurred—to reduce the already existing fluctuation limit. "Reducing" the fluctuation limit means making the limit stricter. By this measure, although the wind turbine generator according to the embodiments does not operate as a primary controller, it contributes to grid stability by reducing source-induced fluctuations. However, limiting the output power fluctuations the accumulated power output will generally be reduced and thereby the effective efficiency of the wind turbine generator lowered. However, by restricting this measure to situations in which the grid-stability is (temporarily) deteriorated, the loss of electric energy produced will be limited.

In the embodiments limiting the active-power fluctuations is, e.g., achieved by means of blade pitch adjustment. In some embodiments active-power fluctuations are also limited electrically, by corresponding control of the wind turbine generator's electric-power converter. However, the later results in imbalance between the amount of wind power converted into mechanical power of the wind turbine generator's rotor and the electric output power which, e.g., results in acceleration of the rotor.

Therefore, in some embodiments electrically limiting power is only performed in combination with blade-pitch adjustment to cope with wind-speed transients For example, when the wind speed rises faster that the pitch can be adjusted to compensate for the wind speed rise, the output power is first limited electrically and, once the blades have been pitched to their new pitch angle, is then limited by the pitch adjustment.

The present description focuses on limiting, or further limiting, the output-power fluctuations. However, the invention also goes in the other direction, that is relaxing or cancelling the limit, in an analogous manner. That is to say, upon detection of increased grid stability, the operation of the wind turbine generator is changed by cancelling or relaxing a previously set fluctuation limit.

The monitoring and limit-adjustment function is a self-diagnosis and self-adjustment function performed by a control system at the level of individual wind turbine generators, or at the level of a wind power plant, or at a higher level in the utility grid. The control system can also be distributed, e.g., include controllers at the wind-park and the wind-turbine level.

In some embodiments the frequency range covered by grid-frequency fluctuations is permanently determined, and a variation of the grid frequency outside an allowed-frequency range $F_{max}/F_{min}$ (between an allowed maximum frequency $F_{max}$ and an allowed minimum frequency $F_{min}$) range is considered to be a detection of a reduced grid stability condition, i.e. a frequency dead band. Alternatively or in addition, the variance of the grid frequency is permanently determined, and a rise beyond a variance threshold is considered to be a detection of a reduced grid stability condition. The allowed fluctuation of the wind turbine generator's or wind power plant's power output is then reduced.

In some embodiments monitoring whether the grid-frequency fluctuations are within the allowed-frequency range, or whether their variance is below the variance threshold is performed in an absolute manner, i.e. without taking into account any correlation of the grid frequency and the output power produced by the wind turbine generator or wind power plant.

However, correlation-less monitoring grid-frequency fluctuations is somewhat unspecific in the sense that it is not ensured that the fluctuation of the wind-turbine or wind power plant considered actually contributes to the grid-frequency fluctuations observed. Therefore, in these embodiments the reduction of the fluctuation limit might be in vain, and would only produce costs (by the reduction of the accumulated power output caused by it). Therefore, in other embodiments the monitoring of grid stability comprises determining a correlation between power supplied to the electrical grid and grid frequency. Correlation means that if the power output increases the grid frequency also increases. The grid frequency is, e.g., measured at the wind turbine generator's terminals or at a wind power plant's point of coupling to the grid. If, however, no increase of the grid frequency is observed upon increase of the output power there is no correlation. Actually, "correlation" can be a continuous parameter measuring the degree of coincidence between the output power increase and the grid frequency rise.

In some of the embodiments, the bigger is the correlation thus determined, the smaller is the grid stability detected. To be considered as an indicator for reduced grid stability, a rise of the correlation has to be significant in some embodiments, e.g., the rise has to exceed a maximum-acceptable correlation threshold. The allowed fluctuation of the wind turbine generator's output power is then reduced. Linking the reduction of the fluctuation limit to the observed correlation between output-power fluctuations and grid-frequency fluctuations ensures that the reduction of the output-power fluctuation limit actually contributes to reduction of the grid-frequency fluctuations.

In some embodiments, the correlation information is used to determine whether the variation of the grid frequency extends beyond the allowed-frequency range $F_{max}/F_{min}$ or whether the frequency variance exceeds the variance limit, by taking only those peaks (or dips) in the grid frequency into account which can be attributed to a corresponding peak (or dip) of the output power of the wind turbine generator or wind power plant considered. This is taking into account correlation on a peak-by-peak basis.

In other embodiments the correlation information is used for the same purpose more globally, (not peak-by-peak) by multiplying the uncorrelated fluctuation amplitude by the magnitude of the correlation, which may be a number between 0 and 1 (or by multiplying the uncorrelated frequency variance by the square of the fluctuation). "Diluting" the observed uncorrelated fluctuation amplitude or variance in this manner takes into account that only a fraction of the observed uncorrelated fluctuation amplitude or variance is due the output-power fluctuations of the wind turbine generator or wind power plant considered.

A prerequisite of such a correlation measurement is that there is a variation of the wind turbine generator's output power. In some embodiments, also referred to as "passive-variation embodiments", use is made of the output power variations caused by the natural wind-speed variations. These passive-power variations are tracked and correlated with the measured grid frequency.

In some embodiments the limit on power fluctuations is chosen such that the grid-frequency fluctuations caused by the supply of power are maintained inside the range $F_{max}/F_{min}$ or the variance of grid-frequency fluctuations caused by the supply of power is maintained below the variance limit.

In some of these embodiments the entire grid-frequency fluctuation (including the contribution not caused by the wind turbine or wind park considered) is to be maintained inside the range $F_{max}/F_{min}$ or below the variance threshold, while in other embodiments only that fraction of the grid-frequency fluctuations which is caused by the power supply of the wind turbine or wind park considered is maintained inside the range $F_{max}/F_{min}$ or below the variance threshold.

In some of the embodiments in which the (entire or fractional) grid-frequency fluctuation is to be maintained inside the range $F_{max}/F_{min}$ or below the variance threshold, the fluctuation limit to the output power is continuously adjusted to that extent of limit just needed to keep the grid frequency inside the range $F_{max}/F_{min}$ or the variance below the variance threshold. That means that the power production by the wind turbine or wind park is maximized by letting the output power fluctuate, but the fluctuation is limited, or modulated, if the grid frequency goes beyond $F_{max}/F_{min}$ Thus, the objective the continuous adjustment is to avoid the grid frequency to go out of the $F_{max}/F_{min}$ range without losing more power production than necessary.

In some embodiments the operation of the wind turbine is automatically switched between two discrete operation modes, that is to say from a normal-operation mode (i.e. a mode with no power-fluctuation limit, or with a relatively relaxed power-fluctuation limit) to a reduced fluctuation mode (in which the power fluctuation limit is activated). The automatic mode switch from the normal-operation mode to the reduced-fluctuation mode is triggered, in some of these embodiments, by detection of a reduction of the grid stability beyond a lower mode-switch threshold. Switching from the reduced-fluctuation mode back to the normal-operation mode can likewise be triggered by detection of an increase of the grid stability beyond an upper mode-switch threshold.

In some of the mode-switching embodiments the reduced-fluctuation mode is maintained a minimum time interval before the mode can switch back to the normal-operation mode. By this measure too frequent mode switching can be avoided. Moreover, there may be a contractual agreement with the grid provider according to which the wind-power producer is committed to supply output power with strongly limited output-power fluctuation during a predetermined time interval, say 15 min. The wind-power producer can be compensated for the production loss suffered due to this (exemplary) 15-min. period of smooth output power supply.

In some of the mode-switching embodiments the power-fluctuation limit is kept constant during the reduced-fluctuation mode. Constancy of the power-fluctuation limit refers to the width of the limit relative to a mean output power; it does not necessarily mean that the absolute values of the upper and lower power limits are kept constant. In some embodiments the limit is relative a mean value of the power produced. For example, if the mean power produced increases with time, the absolute values of the upper and lower power-fluctuation limits will also increase.

In other mode-switching embodiments the fluctuation limit is also adjusted to avoid the grid frequency to go out of the $F_{max}/F_{min}$ range without losing more power production than necessary, as was described above. This adjustment may be stepwise (an setting adjusted at the beginning of mode switch and then kept constant for a certain period of time) or continuous. Thus, the output-power adjustment to keep the grid frequency inside the range $F_{max}/F_{min}$ or below the variance threshold, to that extent of limit just needed to keep the grid frequency inside the range $F_{max}/F_{min}$ or the variance below the variance threshold applies to both the continuous-adjustment embodiments and the mode-switching embodiments.

It has already been mentioned that limiting power fluctuation may result in a loss of accumulated power. A loss of accumulated power could be avoided if not only peaks of the output power ("positive fluctuations") were cut, but also dips of the output power ("negative fluctuations") were lifted, or filled up, in a symmetric manner. However, in some embodiments the wind turbine is at its optimal working point during normal-mode operation, which does not allow any increase of the output power. Therefore, limiting output fluctuations is rather performed in an asymmetric manner, by cutting the output power during positive fluctuations (cutting high output peaks), without (or without significantly) lifting the relative output power during negative fluctuations. As explained above, cutting the output power during positive fluctuations is, e.g., achieved by a corresponding adjustment of the blade-pitch angle towards the flag position.

The strictness of the limit on output-power fluctuations, and/or the position of the threshold which has to be exceeded by the grid instability so that mode switching is performed, may also depend on other factors than the monitored grid stability.

For example, in some of the embodiments a wind forecast is used to vary the fluctuation limit, e.g., to make it stricter when the forecast predicts increased wind-power fluctuation. Moreover, in mode-switching embodiments the mode-switch threshold may be varied in response to the wind forecast. For example, the threshold may be varied upon a forecast of increased windpower fluctuation such that switching from the normal-operation mode to the reduced fluctuation mode is already triggered at a less pronounced reduction of the grid stability.

Similarly, in other embodiments an expectation of power consumption in the electrical grid is used to vary the fluctuation limit, or to vary the mode-switch threshold. For example, a power consumption expectation giving rise to expectation of increased grid-frequency fluctuation may render the fluctuation limit stricter, or modify the mode-switch threshold such that switching from the normal-operation mode to the reduced-fluctuation mode is already triggered at a less pronounced reduction of the grid stability.

Some embodiments pertain to a control system arranged to control at least one wind turbine which may include some, or all, of the wind turbines of a whole wind park, in the manner describe above. The control system may be an individual wind turbine controller, a wind power plant controller, a power plant controller or a controller at a higher level in the grid and connected to the wind-turbine controller to send limit-fluctuation commands. The control system can be distributed, e.g., include controllers at the wind-park and the wind-turbine level or utility-grid level.

An objective of the dispatcher of the present invention is to use the surplus of available power from a subset of wind turbine generator inside a wind power plant to compensate the lack of power in others wind turbine generator, thus regulating the total wind power plant power output to a desired value.

The dispatcher of the present invention works as follows:

At least one wind turbine generator receiving lower wind speeds are allowed to generate power without constraint, meaning that produced power may vary with the wind speed. That is, the electrical power from this sub-group is generated according to actual wind speed.

Wind turbine generator with higher wind speeds generate regulated (constrained) power. That is, the electrical power from this sub-group is generated according to a set point sent from the dispatcher.

Power fluctuations from low wind speed wind turbine generator group are compensated by changing the set points of high wind speed wind turbine generator group accordingly. Therefore the total wind power production in the wind power plant remains regulated to a desired value by the dispatcher, as long as regulated wind turbine generator inside the wind power plant receive surplus of wind power.

Inside the wind power plant, the power generated from each fluctuating wind turbine generator is always lower than the power generated from each regulated wind turbine generator. Therefore in some embodiments, all the wind turbine generators in the wind power plant can receive the same common set point value from a central controller, thus wind turbine generator with low wind speed will generate just what is possible locally while wind turbine generator with surplus of wind will follow the common set point value.

The common set point value may be restricted locally at each wind turbine generator depending on local constraints, e.g., maximum/minimum powers, individual de-loading, etc. In such case, the dispatcher will take this individual wind turbine generator as non-controllable (i.e. fluctuating).

A variable speed wind turbine generator, which is used in at least one of the above described embodiments and which is capable for being connected to an electrical grid is equipped with the control system described above. It comprises a rotor with a hub and at least one blade mounted to the rotor as discussed above. The rotor is connected, for example via a main shaft, to a generator for translating the torque of the rotor into electrical power. In some embodiments, a gearbox is interconnected between the rotor and the generator in order to translate the rotational speed of the rotor into a higher speed for the generator.

FIG. 1 shows, an exemplary variable-speed wind turbine generator (WPS) 1 is one of a plurality of wind turbine generators of a wind power plant (WPP) 2. It has a rotor 3 with a hub to which, e.g., three rotor blades 4 are mounted. The pitch angle of the rotor blades 4 is variable by means of pitch actuators. The rotor 3 is supported by a nacelle 5 and drives a generator 12 via a main shaft 8, a gearbox 10, and a high speed shaft 11. This structure is exemplary; other embodiments, for example, use a direct-drive generator.

The generator 12 (e.g., Induction or synchronous generator) produces electrical output power of a frequency related to the rotation speed of the rotor 3, which is converted to grid frequency (e.g., about 50 or 60 Hz) by a converter 19. The voltage of the electric power thus produced is up-transformed by a transformer 9. The output of the transformer 9 is the wind turbine generator's terminals 9a. The electric power from the wind turbine generator 1 and from the other wind turbine generators of the wind power plant 2 is fed into a wind power plant grid 18 (symbolized by "a" in FIG. 1). The wind power plant grid 18 is connected at a point of common coupling 21 and an optional further step up transformer 22 to a wind power plant external electrical utility grid 20. The utility grid 20 is equipped with regulation capacity against grid-frequency fluctuations, e.g., in the form of conventional producers which can increase and lower production on a short-time scale to control frequency.

A control system includes a wind turbine controller 13 and a wind power plant controller 23. The wind turbine controller 13 controls operation of the individual wind turbine generator 1, e.g., selects the full-load or partial-load operation mode, depending i.a., on the current wind speed, causes, in the partial load mode, operation of the wind turbine generator at the optimal working point by adjusting the blade angle and controlling the tip speed ration to the aerodynamic optimum at the current wind speed, and controls the converter 19 to produce electricity according to prescriptions of the wind-park-controller, e.g., an instruction to provide a certain amount of reactive power in addition to the active power, etc. The wind turbine controller 13 uses different input signals to perform its control tasks, for example signals representing current wind conditions (e.g., from an anemometer 14 and a wind vane 15), feed-back signals representing pitch angle, rotor position, amplitudes and phases of the voltage and current at the generator 12 and the terminals 9a, etc., and command signals from the wind power plant controller 23. The wind power plant controller 23 receives signals representative of the voltage, current and frequency at the point of common coupling 21 (parameters which may be considered to represent the voltage, current and frequency in the utility grid 20) and, optionally, receives information or command signals from the utility-grid provider (at "c" in FIG. 1). Based on some of these (and, optionally, further) input parameters the wind power plant controller 23 monitors grid stability and, upon detection of a reduction of grid stability, commands the wind turbine controllers 13 of the wind turbine generator 1 and the other wind turbine generators of the wind power plant 2 (at "b" in FIG. 1) to change operation by limiting fluctuations of the output power supplied. Upon receipt of such a command the wind turbine controller 13, upon increase of the wind speed, cuts the high-output peak which would then be produced in normal partial-load operation with maximum efficiency, e.g., by adjusting the blade-pitch angle towards the flag position, to comply with the wind-park controller's limit-fluctuation command. Thus, in the exemplary embodiment of FIG. 1 the control task of the control system to limit output fluctuations is shared by the wind power plant controller 23 and the wind turbine controller 13. In other embodiments this control task is performed by the wind turbine controller 13 alone; in those embodiments, the "control system" is represented just by the wind turbine controller 13, without a wind power plant controller.

Although the wind turbine generator 1 shown in FIG. 1 is expected to have three rotor blades 4, it should be noted that a wind turbine generator may have different number of rotor blades. It is common to find wind turbine generators having two to four rotor blades. The wind turbine generator 1 shown in FIG. 1 is a Horizontal Axis Wind Turbine (HAWT) as the rotor 3 rotates about a horizontal axis. It should be noted that the rotor 3 may rotate about a vertical axis. Such a wind turbine generators having its rotor rotate about the vertical axis is known as a Vertical Axis Wind Turbine (VAWT). The embodiments described henceforth are not limited to HAWT having three rotor blades. They may be implemented in both HAWT and VAWT, and having any number of rotor blades 4 in the rotor 3.

In an embodiment the first subset consists of wind turbine generators and wherein the second subset consist of conventional power sources, such fossil fuel fired power plant or hydropower plants, meaning that the fluctuation regulation takes place in the conventional power source and not in the wind power plant.

In an embodiment the dispatcher includes other power sources (conventional) into the first or second subset of wind turbine generators. An advantage for that embodiment is that the reserve capacity is from a conventional power source and that such power sources are easier to control, i.e. the same applies for Energy Storage Devices.

Figure 2:
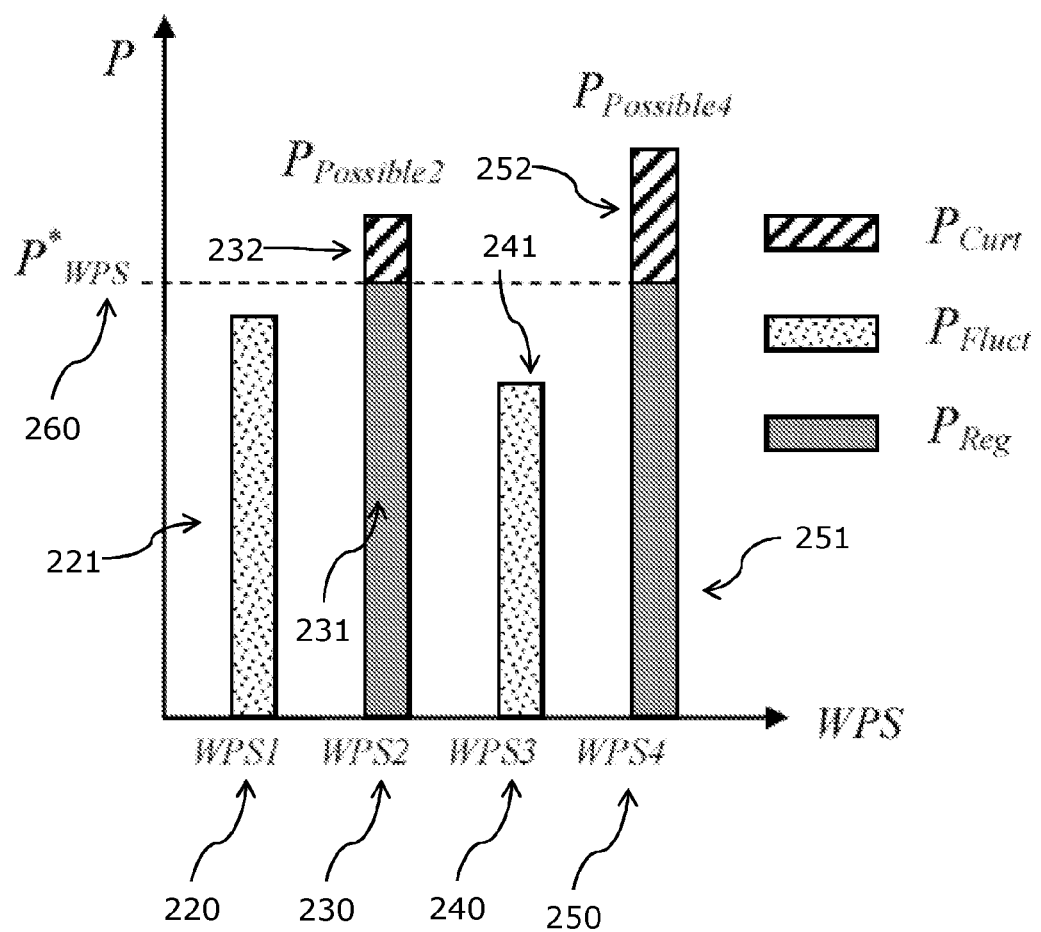
FIG. 2 shows the principle of dispatcher for a wind power plant according to the present invention.

FIG. 2 shows the basic principle of dispatcher for a wind power plant according to the present invention. Where in the wind power plant comprise four wind turbine generators WPS 220, 230, 240, 250. Wind turbine generator 220 and 240 produces power below the common reference $P_{WPS}$ 260 and therefore is the power considered fluctuating 221 and 241. Whereas wind turbine generator 230 and 250 produces power above the common reference $P_{WPS}$ 260, thus the power produced 231 and 252 is regulated, with a curtailed amount of power 232 and 252.

Figure 3:
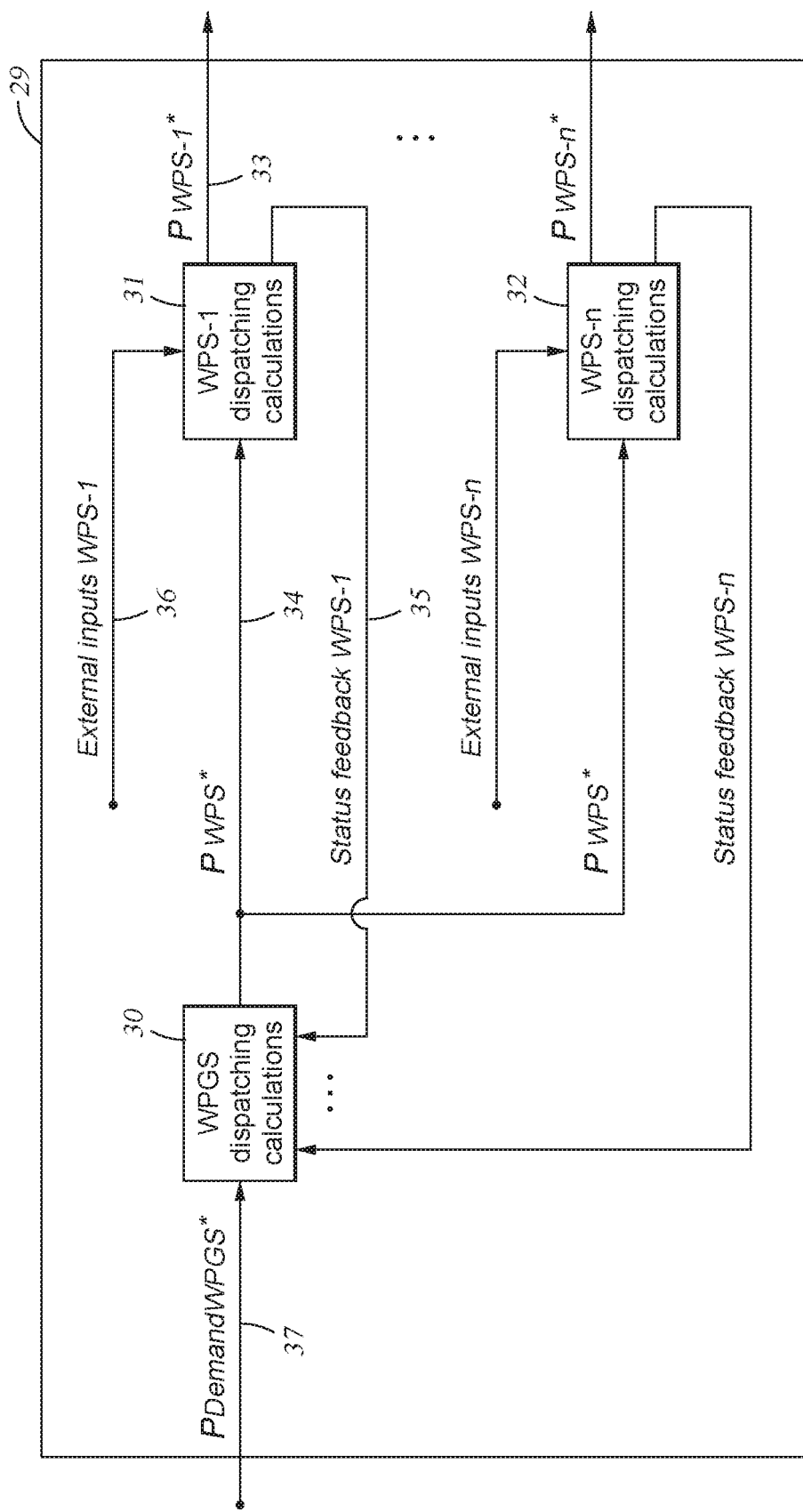
FIG. 3 shows an embodiment of the dispatcher.

FIG. 3 exemplifies the arrangement of the calculation modules inside the dispatcher 29. The dispatcher receives a power demand 37 that in the $W_{PGS}$ dispatching calculations module 30 calculate the common active power set point $P_{WPS}$ 34, based on a plurality of status feedback signals WPS-1:n 35. The common active power set point PWPS 34 is used to calculate the active power set point 33 to each of the wind turbine generators 1 in a plurality of dispatching WPS-i calculation modules 31 and 32, in reality there are n modules or the calculation is performed n times.

The following equations describe the dispatcher algorithm:

Demand power reference for the wind power plant, $P_{DemandWPGS}$:

$$P_{DemandWPGS} = P_{Reg} + P_{Fluct} \quad (1)$$

Total amount of regulated power in wind power plant:

$$P_{Reg} = NWPS_{Reg} \cdot P_{WPS}, \quad (2)$$

where $NWPS_{Reg}$ is the number of wind turbine generator that are constrained by the common set point, $P_{WPS}$.

Total electrical power that is not limited (fluctuating):

$$P_{Fluct} = \Sigma P_{WPS-i}; \; \forall \{i \in NWTG_{Fluct}\} \quad (3)$$

where $NWPS_{Fluct}$ is the number of wind turbine generator that are not constrained by the set point $P_{WPS}$ and $P_{WPS-i}$ is the actual electrical power produced by the WPS-i belonging to $NWPS_{Fluct}$.

Therefore the total demanded power for the wind power plant is:

$$P_{DemandWPGS} = NWPS_{Reg} \cdot P_{WPS} + P_{Fluct} \quad (4)$$

From eq. (4) the common set point, $P_{WPS}$, for all the wind turbine generator in the wind power plant is:

$$P_{WPS} = \frac{P_{DemandWPGS} - P_{Fluct}}{NWPS_{Reg}}; \quad (5)$$

$$\forall \{NWPS_{Reg} \geq 1\}$$

The eq. (5) is the basic dispatching rule. To determine in practice the $NWPS_{Reg}$ and the $P_{Fluct}$ it is necessary to know the wind turbine generator states at each instant by means of feedback signals to the central controller.

As example, two different ways for determining the $NWPSR_{eg}$ and the $P_{Fluct}$, based on WPS feedback, are presented as follows:

By reading the actual electrical power from each WPS, $P_{WPS-i}$, and comparing it with the common reference $P_{WPS}$, thus:

$$P_{Fluct} = \Sigma P_{WPS-i}; \; \forall \{P_{WPS-i} < P_{WPS}\} \quad (6)$$

$$NWPS_{Reg} = \Sigma i; \; \forall \{P_{WPS-i} \geq P_{WPS}\} \quad (7)$$

By knowing the status of the internal flag External_Ref in each WPS that indicates the source of the power reference being adopted in the wind turbine generator local control. Thus:

$$P_{Fluct} = \Sigma P_{WPS-i}; \; \forall \{\text{External Ref}_i = 0\} \quad (8)$$

$$NWPS_{Reg} = \Sigma i; \; \forall \{\text{External Ref}_i = 1\} \quad (9)$$

The maximum $P_{MaxWPS-i}$ and the minimum $P_{MinWPS-i}$ allowed set points are also necessary to know in order to determine whether the WPS-i is regulated or not by the Dispatcher, because if $P_{WPS} > P_{MaxWPS-i}$, or $P*WPS < P_{MinWPS-i}$, the WPS-i cannot be regulated by the dispatcher and it should not be part of the $NWPS_{Reg}$.

For a further development of this dispatching algorithm, particular operational conditions must be considered. For example eq. (5) only works when $NWPS_{Reg} \geq 1$, i.e. when at least one wind turbine generator inside the wind power plant is being regulated, having power surplus from wind. Another condition to consider is when the operator of the wind power plant, WPGS needs, for some reason, to reduce the production of only one wind turbine generator. A further analysis of these operational conditions is done as follows.

When $NWPS_{Reg} = 0$ all the wind turbine generators in the wind power plant produce fluctuating power, therefore they do not follow an external set point $P_{WPS}$ and the total wind power production, $P_{WPGS}$, is not regulated in this case. This particular situation can generate two different states, on which particular power references can be applied as follows:

Case $NWPGS_{Reg} = 0$ and $P_{DemandWPGS} > P_{WPS}$: In this case the total wind power plant production is lower than the demanded power, therefore wind turbine generator should receive a set point that allows an increase in production when later wind increases locally. The value of this particular (not individual) set point should of course be higher than the actual electrical power of each WPS. An extreme case is by setting this set point equal to the rated WPP power, for all the WPS. Thus:

$$P_{WPS} = P_{RatedWPS};$$
$$\forall \{NWPS_{Reg} = 0 \& P_{WPGS} < P_{DemandWPGS}\} \quad (10)$$

Case $NWPGS_{Reg} = 0$ and $P_{WPP} > P_{DemandWPGS}$: Here the total WPP production is higher than the demanded power but no wind turbine generator is counted as regulated. This situation is generated when wind speed increases, or WPGS demand is reduced, while WPS set points are given by eq. (10). Therefore wind turbine generator set point should be reduced to a value that allows the regulation of the wind power plant according to $P_{DemandWPGS}$. An option for determining the set point in this case is to constraint only the wind turbine generator having actual production equal or higher than a mean set point value, $P_{MeanWPS}$:

$$P_{MeanWPS} = \frac{P_{DemandWPGS}}{NWPS}; \quad (11)$$

$$\forall \{NWPS \geq 1\}$$

Therefore the group of wind turbine generator with actual $P_{WPS} < P_{MeanWPS}$ will not be constrained by the new set point. To calculate the new wind turbine generator set points, the regulated power component of the wind power plant should be determined and then distributed among the wind turbine generator having actual $P_{WPS} \geq P_{MeanWPS}$, represented by $N_{HiMean}$. That is:

$$P_{WPS} = \frac{P_{DemandWPGS} - P_{LoMean}}{N_{HiMean}}; \quad (12)$$

$$\forall \{NWPS_{Reg} = 0 \& P_{WPGS} \geq P_{DemandWPGS}\}$$

Where the W_PGS production component given by fluctuating wind turbine generator, $P_{LoMean}$, is:

$$P_{LoMean} = \Sigma P_{WPS-i}; \; \forall \{P_{WPS-i} < P_{MeanWPS}\} \quad (13)$$

and the number of wind turbine generator that will be regulated by $P_{WPS}$ is:

$$N_{HiMean} = \Sigma i; \; \forall \{P_{WPS-i} \geq P_{MeanWPS}\} \quad (14)$$

Notice that, by adopting the set point from eq. (12), the new state from the wind turbine generator after feedback will become $NWPSR_{eg} \geq 1$ and the wind turbine generator set point in the next sample (k) will then be given then by eq. (5).

As mentioned before, another operational condition is when the wind power plant operator needs to reduce the power of just one wind turbine generator, while remaining wind turbine generator continue to operate normally. In this case it is sufficient to compare the $P_{WPS}$ with the new value from the operator, $P_{OperatorWPSi}$, and then take the minimum of these to get the set point for that particular WPS-i, $P_{WPSS-i}$:

$$P_{WPS\text{-}i} = \min\{P_{WPS}, P_{operatorWPS\text{-}i}\} \quad (15)$$

Expressions (5) to (15) can be discretized for implementation in a digital controller. Furthermore, they can be grouped in two types of calculation modules: (i) one module for calculating wind power plant values and (ii) other modules for calculating individual WPS-i values (one module per wind turbine generator). The WPGS calculation module interchanges signals with each WPS-i calculation module.

Figure 4:
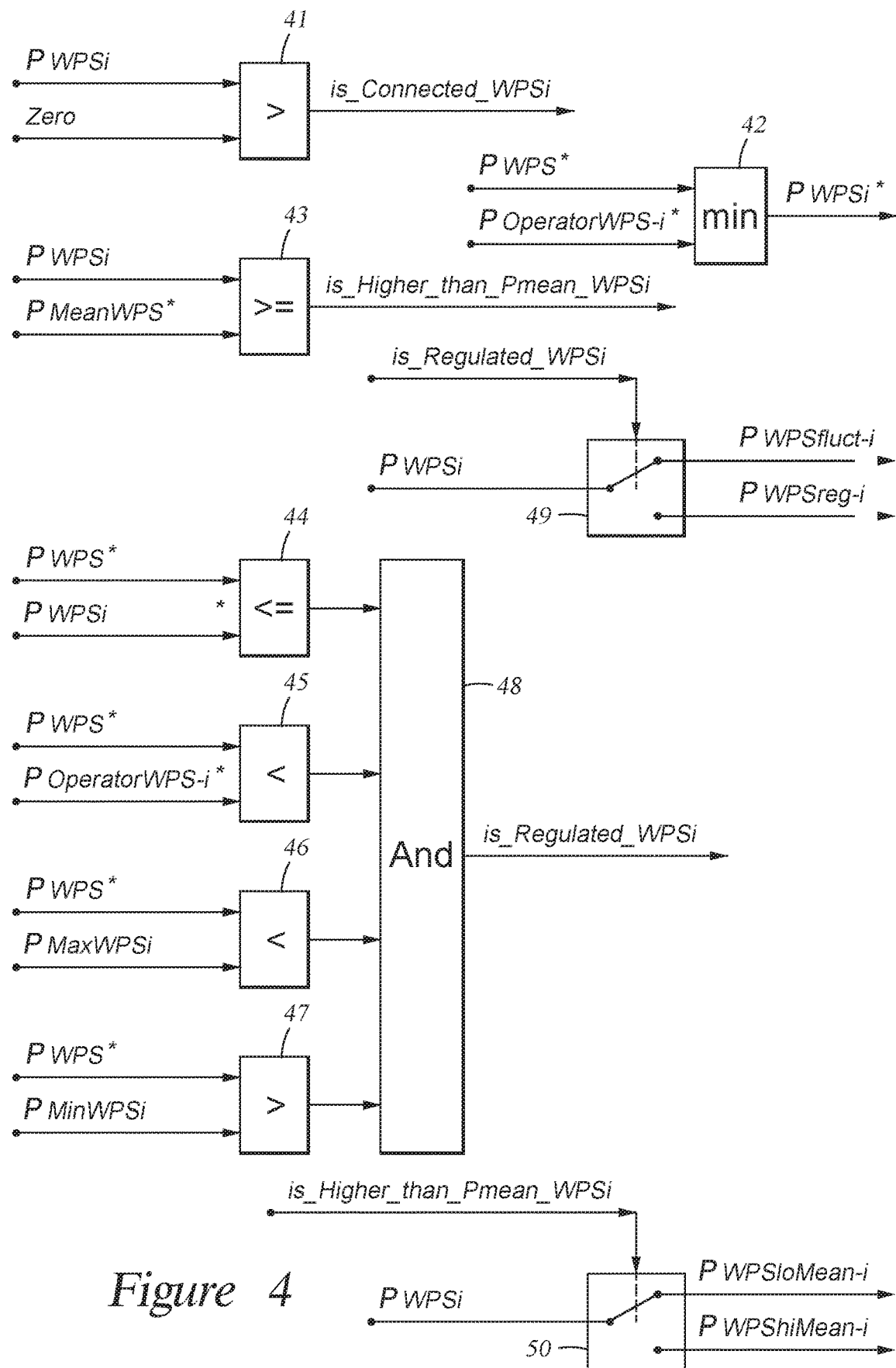
FIG. 4 shows various calculating modules of the dispatcher.

FIG. 4 describes the complete algorithm for the WPS-i calculation module 31, 32 corresponding to each wind turbine generator. In comparison module 41 the variable is_connected_WPSi is calculated. In comparison module 42 variable $P_{WPSi}$ is derived as a minimum of two variables $P_{WPS}$ and $P_{OperatorWPS-i}$. In comparison block 43 the variable is_Higher_than_Pmean_WPSi is calculated. Block 48 is an AND function and get inputs from block 44 to block 47, the output of block 48 is the variable is_Regulated_WPSi. Block 49 is a switch module that operates based on the output of block 48. It determines whether a specific reference setpoint PWPSi is fluctuating or not. Block 50 is a switch module which determines whether a specific reference setpoint PWPSi is above or below a mean value.

Figure 5:
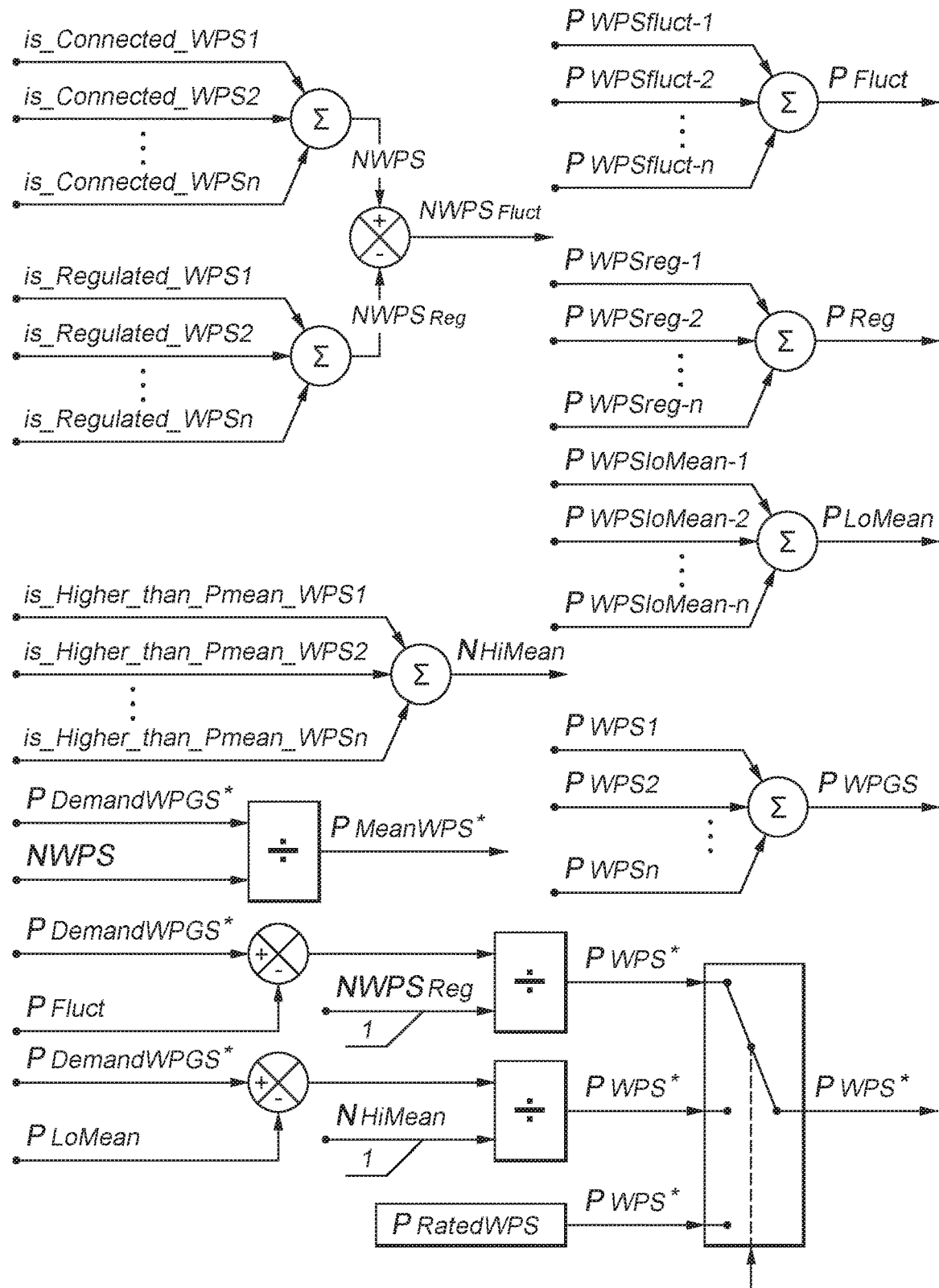
FIG. 5 shows various calculating modules of the dispatcher.

FIG. 5 describes the complete algorithm for the wind power plant inside the WPGS dispatching calculations module 30. It discloses the various summations needed to derive Eq. 1-15 in a block diagram.

Figure 6:
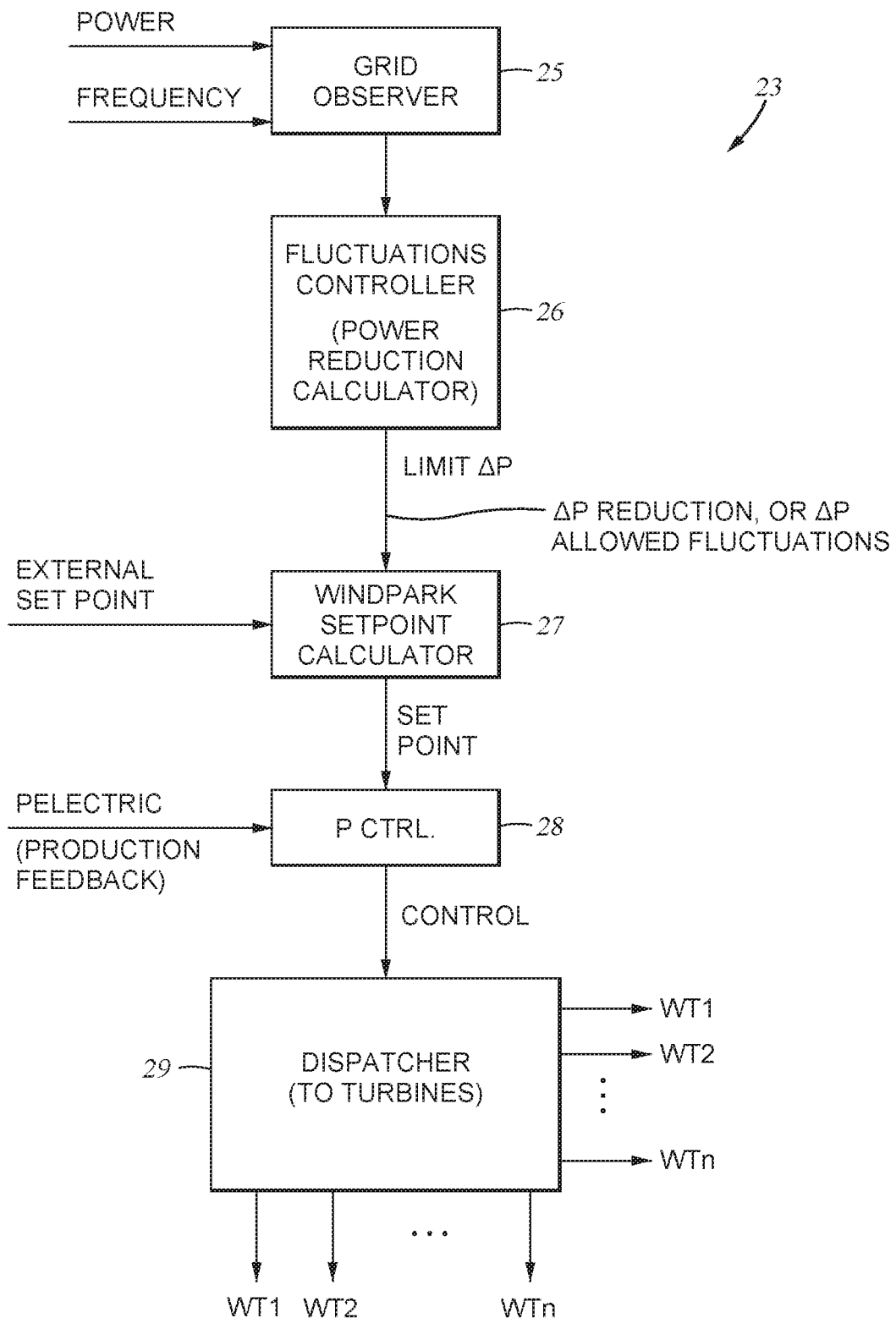
FIG. 6 shows a functional circuit diagram of an embodiment of a wind power plant controller according to the invention

FIG. 6 is a functional circuit diagram of an embodiment of a wind power plant controller 23 arranged to perform the method explained in connection with FIG. 3. The wind power plant controller 23 implements a grid-observer function 25 which monitors the grid frequency and the output power, e.g., at the point of common coupling 21 of the wind power plant 2. The output of the grid-observer function 25 is provided to a fluctuations controller 26 which is arranged to determine the correlation between output-power and grid-frequency fluctuations, and to determine the amount of power reduction, that is to say Limit ΔP. As explained, Limit ΔP is determined so as to allow the amount of acceptable fluctuation. Limit ΔP is input to a wind-park set point calculator 27 which is arranged to transform it in a power-output setpoint of the wind park. To determine the power-output setpoint, the wind power plant set point calculator 27 can also consider an external-point signal, e.g., from the grid provider. Based on the setpoint, an output-power controller 28 produces a control signal for the power to be output by the wind power plant 2, using on a feedback signal representing the actual power produced by the wind power plant. The control signal is fed to a dispatcher 29 which is arranged to split the regulation among the individual wind turbines generators (here referred to as WT1, WT2, . . . WTn) of the wind power plant, and calculates individual set points. The individual set points may differ for the wind turbine generators WT1, WT2, WTn, e.g., due to different wind conditions for the for the wind turbine generators WT1, WT2, WTn. The dispatcher bases the splitting activity on feedbacks about the operating states of the wind turbine generators WT1, WT2, WTn.

The individual set points are transmitted to the individual wind-turbine controllers, one of which is the wind-turbine controllers 13 of FIG. 1.

The wind power plant controller 23 is thus arranged to calculate and send set points for the wind turbine generators in order to obtain a reduction of the total power to contribute to grid-frequency stability.

The reduction is such that it maximizes the wind power plant yield. This is also referred to as "system power balancing." The wind power plant controller 23 adjusts the wind power plant set point and the wind turbine generator set points continuously to balance power production and frequency fluctuations.

Figure 7:
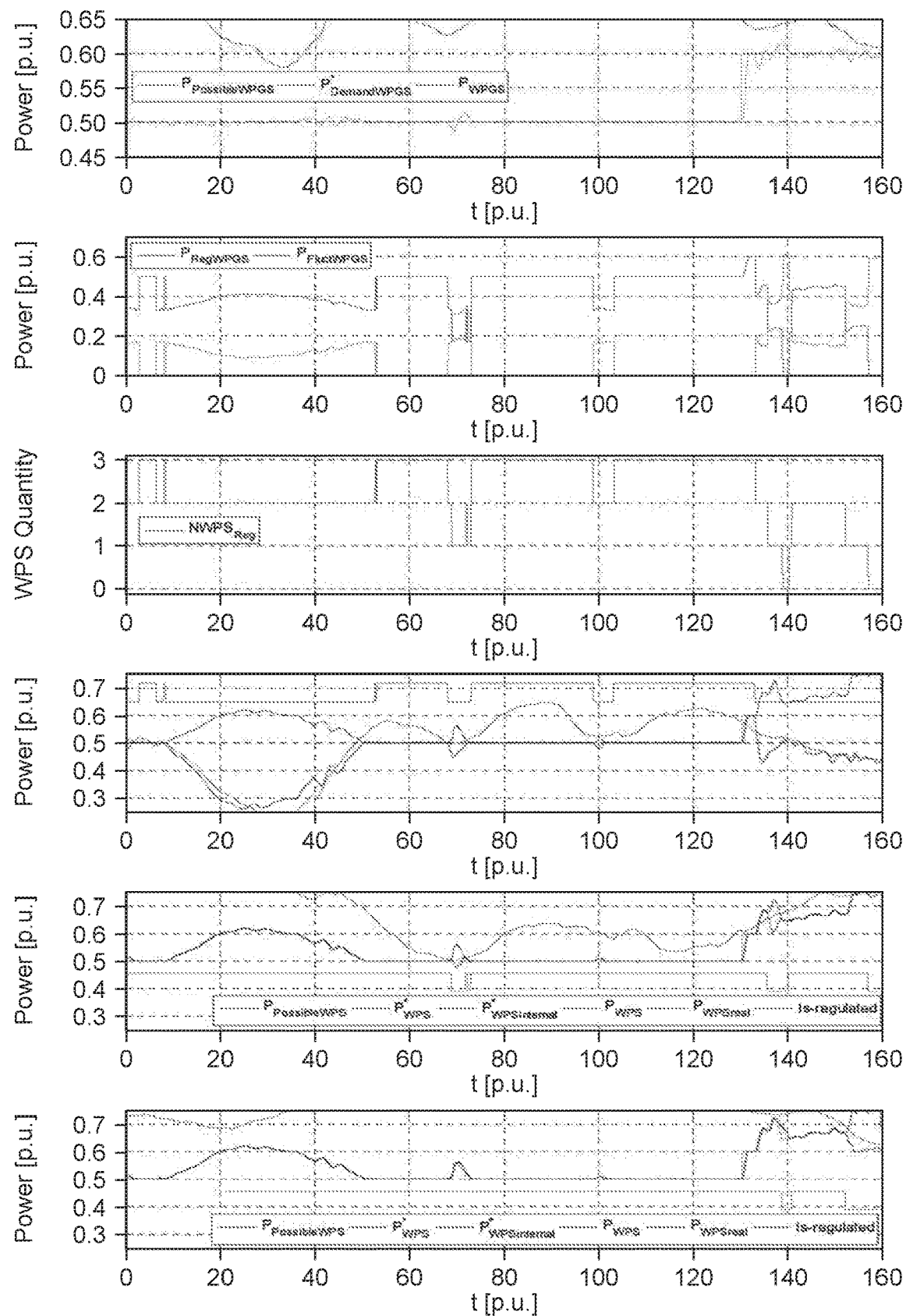
FIG. 7 shows simulation results of an embodiment of the present invention
Figure 8:
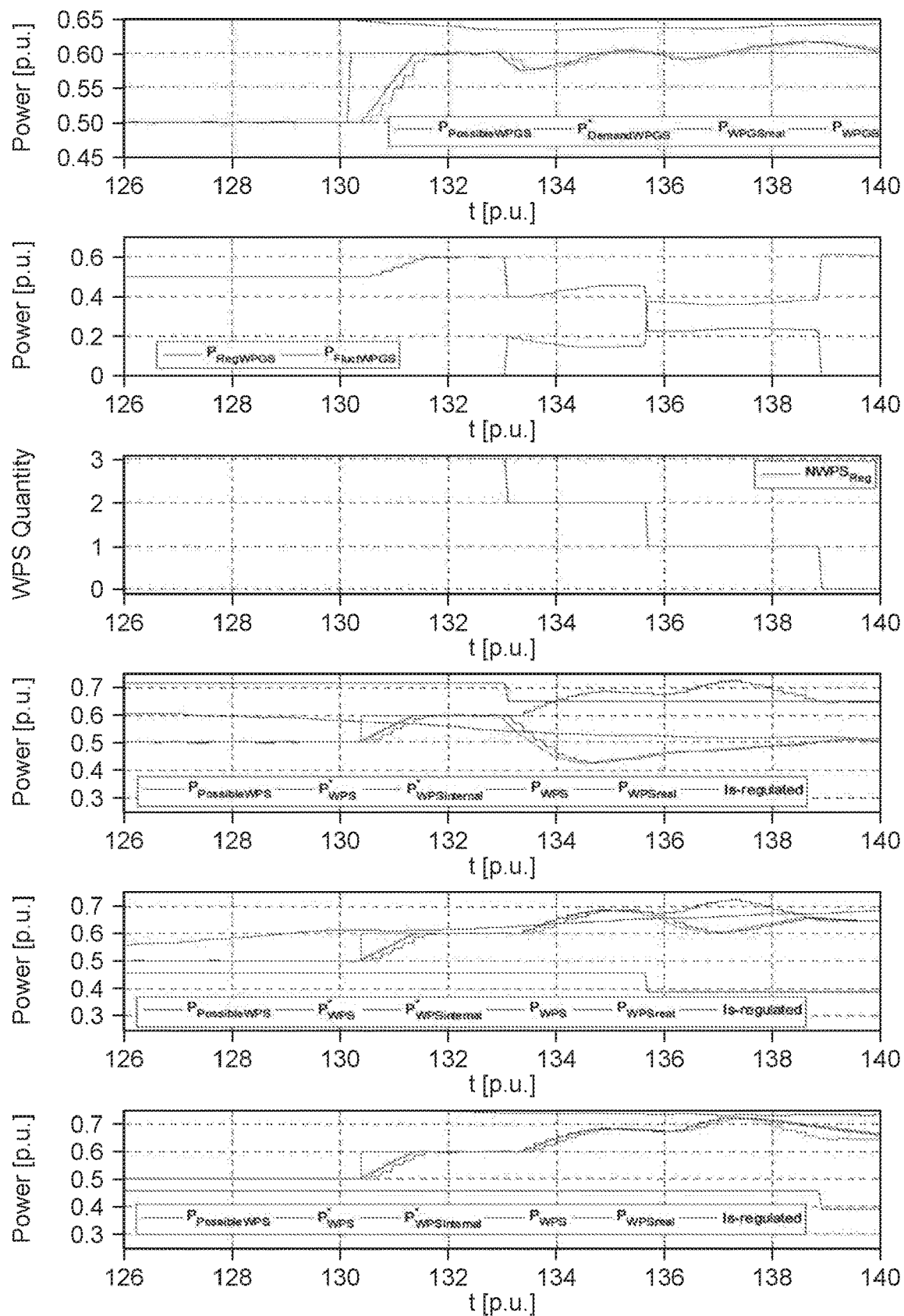
FIG. 8 shows simulation results of an embodiment of the present invention

FIG. 7 shows simulation results of the performance of this dispatching algorithm and FIG. 8 is a zooming-in around a set point change. The total wind power plant production, $P_{WPGS}$, is regulated to $P_{DemandWPGS}$ as long as wind turbine generator's with surplus of power are available. A set point event is simulated at t=130 p.u., where $P_{DemandWPGS}$ was increased 10% from WPGS nominal. Observe that the $P_{WPS}$ set point changes with $P_{DemandWPGS}$ but also compensating individual $P_{WPS}$ fluctuations.

Figure 9:
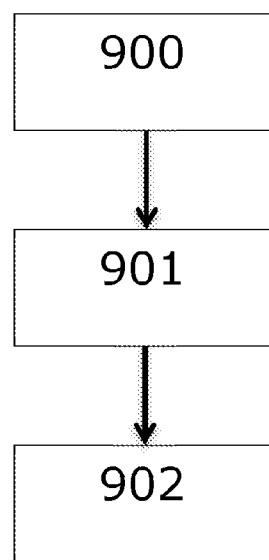
FIG. 9 is a schematic flow chart of an embodiment of the method.

FIG. 9 shows a flow chart of a method according to the invention for operating a wind power system, comprising a first subset of wind turbine generators and a second subset of wind turbine generators. Step 900 includes analyzing an active power output of each of the first subset of wind turbine generators. Step 901 includes calculating an active power set point to at least the second subset of wind turbine generators based on the active power output of the first subset of wind turbine generators and step 902 includes dispatching the active power set point to at least each of the second subset of wind turbine generator to minimize power fluctuations.

Individual WPS can experience a drop in power of X pu/s, therefore others WPS should increase power to compensate this reduction. Thus the individual WPS ramp limiters should not be less than X/(NWPS−1) pu/s.

A selection algorithm within the dispatcher selects which wind turbines generator belongs to the first subset and which belongs to the second subset. The selection is a dynamical process and the subset may vary over time as a function of wind speed seen at each wind turbine generator, or as a wear function, so each turbine sees the same structural loads.

In an embodiment the selection algorithm is based on geographical location of the wind turbine generators. As an example a wind power plant with turbines located on a mountain slope, some turbines may "see" high wind all the time and others may "see" fluctuating wind speed, even here the wind condition may vary over time.

In an embodiment the subsets might not be located at the same wind farm (WPP) or adjacent wind farms, it may be a plurality of wind power plant each wind power plant having a point of common coupling different for the other plant, but where the grid operator can apply the dispatcher strategy proposed here.

In an embodiment the first and second subset are located within the same wind power plant, with a common point of coupling. The first subset is an abstract subset that only exists inside the dispatcher logic. The only physical constraint is that they must be connected to the same power system.

The term wind turbine generator, WPS is to be understood both as a single wind turbine generator according to FIG. 1, but in some embodiments it may also be a group of wind turbine generator according to FIG. 1 connected at a point of common coupling, thereby, from a power system operator, seen as one source of wind power from one location.

The term wind power plant, WPGS may in some embodiments be a single wind power plant with a plurality of wind turbine generators according to FIG. 1. In other embodiments wind power plant is to be understood as an aggregation of wind power plants located at different geographical location, either adjacent to each other or remote from each other, but all of them are controllable by means of the dispatcher of the present invention.

Although the present invention has been described in connection with the specified embodiments, it should not be construed as being in any way limited to the presented examples. The scope of the present invention is to be interpreted in the light of the accompanying claim set. In the context of the claims, the terms "comprising" or "comprises" do not exclude other possible elements or steps. Also, the mentioning of references such as "a" or "an" etc. should not be construed as excluding a plurality. The use of reference signs in the claims with respect to elements indicated in the figures shall also not be construed as limiting the scope of the invention. Furthermore, individual features mentioned in different claims, may possibly be advantageously combined, and the mentioning of these features in different claims does not exclude that a combination of features is not possible and advantageous.

Any range or device value given herein may be extended or altered without losing the effect sought, as will be apparent to the skilled person.

It will be understood that the benefits and advantages described above may relate to one embodiment or may relate to several embodiments. It will further be understood that reference to 'an' item refer to one or more of those items.

It will be understood that the above description of a preferred embodiment is given by way of example only and that various modifications may be made by those skilled in the art. The above specification, examples, and data provide a complete description of the structure and use of exemplary embodiments of the invention. Although various embodiments of the invention have been described above with a certain degree of particularity, or with reference to one or more individual embodiments, those skilled in the art could make numerous alterations to the disclosed embodiments without departing from the spirit or scope of this invention.

The invention claimed is:

1. A power system comprising:
a plurality of wind turbine generators; and
a power plant controller configured to:
determine an operation mode of each wind turbine generator of the plurality of wind turbine generators, wherein one or more wind turbine generators are operating in a partial load operation mode, and wherein one or more other wind turbine generators are operating in a full load operation mode;
assign all of the one or more wind turbine generators that are operating in the partial load operation mode to a first subset, wherein the one or more wind turbine generators of the first subset are each permitted to produce active power without constraint by the power plant controller;
assign one or more wind turbine generators that are operating in the full load operation mode to a second subset;
determine a collective active power production of the one or more wind turbine generators of the first subset; and
generate, based on the collective active power production, one or more active power set points that constrain an active power production of the one or more wind turbine generators of the second subset.

2. The power system of claim 1, wherein the power plant controller is further configured to:
determine, for each wind turbine generator of the plurality of wind turbine generators, a respective power output of the wind turbine generator,
wherein assigning the one or more wind turbine generators to the first subset and assigning the one or more wind turbine generators to the second subset are based on the respective power outputs.

3. The power system of claim 1, wherein the power plant controller is further configured to:
determine, for each wind turbine generator of the plurality of wind turbine generators, a respective wind speed value at the wind turbine generator,
wherein assigning the one or more wind turbine generators to the first subset and assigning the one or more wind turbine generators to the second subset are based on the respective wind speed values.

4. The power system of claim 3, wherein the one or more wind turbine generators of the first subset have respective wind speed values that are less than the respective wind speed values of the one or more wind turbine generators of the second subset.

5. The power system of claim 4, wherein the respective wind speed values of the one or more wind turbine generators of the first subset are less than a nominal wind speed.

6. The power system of claim 5, wherein the respective wind speed values of the one or more wind turbine generators of the second subset are at least the nominal wind speed.

7. The power system of claim 6, wherein constraining the active power production of the one or more wind turbine generators of the second subset comprises curtailing the active power production of the one or more wind turbine generators from a nominal power.

8. The power system of claim 1, further comprising:
a plurality of wind turbine controllers, wherein each wind turbine generator of the plurality of wind turbine generators is controlled by a respective wind turbine controller of the plurality of wind turbine controllers, wherein each wind turbine controller is configured to:
receive a respective active power set point;
when the respective wind turbine generator is assigned to the first subset, control an active power production of the respective wind turbine generator without being restricted by the respective active power set point; and
when the respective wind turbine generator is assigned to the second subset, restrict the active power production of the respective wind turbine generator by the respective active power set point.

9. The power system of claim 8, wherein active power fluctuations of an active power output of the power system are reduced.

10. The power system of claim 8, wherein the respective active power set points are a common active power set point that is based on a difference between (i) an active power set point received from the power plant controller and (ii) the collective active power production of the first subset, wherein the difference is scaled by a count of wind turbine generators included in the second subset.

11. The power system of claim 10, wherein the common active power set point is defined as:

$$P_{setpoint} = \frac{P_{demand} - P_{fluctuating}}{N_{regulated}},$$

wherein $P_{setpoint}$ represents the common active power set point, $P_{demand}$ represents the active power set point, $P_{fluctuating}$ represents the collective active power production of the first subset, and $N_{regulated}$ represents the count of wind turbine generators included in the second subset.

12. The power system of claim 11, wherein, at a first wind turbine generator of the plurality of wind turbine generators, the common active power set point is overruled by another active power set point.

13. The power system of claim 1, wherein, for each wind turbine generator of the one or more wind turbine generators operating in the partial load operation mode, the active power of the wind turbine generator is allowed to vary with wind speed variations.

14. A method for operating a wind power system, the method comprising:
 determining an operation mode of each wind turbine generator of a plurality of wind turbine generators, wherein one or more wind turbine generators are operating in a partial load operation mode, and wherein one or more other wind turbine generators are operating in a full load operation mode;
 assigning all of the one or more wind turbine generators that are operating in the partial load operation mode to a first subset, wherein the one or more wind turbine generators of the first subset are each permitted to produce active power without constraint by a power plant controller of the wind power system;
 assigning one or more wind turbine generators that are operating in the full load operation mode to a second subset;
 determining a respective active power output of each wind turbine generator of the first subset; and
 dispatching, using the respective active power outputs, one or more active power set points from the power plant controller to thereby restrict an active power production of each wind turbine generator of the second subset.

15. The method of claim 14, further comprising:
 determining, for each wind turbine generator of the plurality of wind turbine generators, a respective wind speed value at the wind turbine generator,
 wherein assigning the one or more wind turbine generators to the first subset and assigning the one or more wind turbine generators to the second subset are based on the respective wind speed values.

16. The method of claim 15, wherein the one or more wind turbine generators of the first subset have respective wind speed values that are less than the respective wind speed values of the one or more wind turbine generators of the second subset.

17. The method of claim 16, wherein the respective wind speed values of the one or more wind turbine generators of the first subset are less than a nominal wind speed, such that the one or more wind turbine generators of the first subset are operating at partial load.

18. The method of claim 17, wherein the respective wind speed values of the one or more wind turbine generators of the second subset are at least the nominal wind speed, such that the one or more wind turbine generators of the second subset are operating at full load.

19. The method of claim 18, wherein constraining the active power production of the one or more wind turbine generators of the second subset comprises curtailing the active power production of the one or more wind turbine generators from a nominal power.

20. A method of operating a wind power system comprising a plurality of wind turbine generators, the method comprising:
 determining one or more first wind turbine generators of the plurality of wind turbine generators having active power fluctuations that exceed a predefined fluctuation limit, wherein the one or more first wind turbine generators are operating at partial load;
 determining one or more second wind turbine generators of the plurality of wind turbine generators that each have an active power production that exceeds a predefined active power threshold value, wherein the one or more second wind turbine generators are operating at full load;
 permitting an active power production of the one or more first wind turbine generators without curtailment; and
 curtailing an active power production of the one or more second wind turbine generators, such that active power fluctuations in a collective active power production of the wind power system caused by the active power fluctuations of the one or more first wind turbine generators are reduced.

* * * * *